United States Patent
Jenneus et al.

(10) Patent No.: US 7,448,256 B2
(45) Date of Patent: Nov. 11, 2008

(54) SYSTEM AND METHOD FOR DETERMINING THE LEAKPROOFNESS OF AN OBJECT

(75) Inventors: Per Jenneus, Linköping (SE); Fredrik Enquist, Linköping (SE)

(73) Assignee: Sensistor Technologies AB, Linköping (SE)

( * ) Notice: Subject to any disclaimer, the term of this patent is extended or adjusted under 35 U.S.C. 154(b) by 215 days.

(21) Appl. No.: 10/581,615

(22) PCT Filed: Dec. 2, 2004

(86) PCT No.: PCT/SE2004/001783

§ 371 (c)(1),
(2), (4) Date: Jun. 5, 2006

(87) PCT Pub. No.: WO2005/054806

PCT Pub. Date: Jun. 16, 2005

(65) Prior Publication Data

US 2007/0157704 A1    Jul. 12, 2007

(30) Foreign Application Priority Data

Dec. 5, 2003  (JP) ............................. 2003-407157
Dec. 5, 2003  (SE) ................................... 0303278

(51) Int. Cl.
*G01M 3/04* (2006.01)
(52) U.S. Cl. ..................................................... 73/49.2
(58) Field of Classification Search ................. 73/49.2, 73/49.3, 40.7
See application file for complete search history.

(56) References Cited

U.S. PATENT DOCUMENTS

| | | | |
|---|---|---|---|
| 3,762,212 A | 10/1973 | Morley et al. | |
| 4,754,638 A | 7/1988 | Brayman et al. | |
| 5,150,605 A * | 9/1992 | Simpson | 73/49.3 |
| 5,386,717 A * | 2/1995 | Toda | 73/40.7 |
| 5,553,483 A | 9/1996 | Armentrout et al. | |
| 5,767,391 A | 6/1998 | Wong | |
| 5,831,147 A * | 11/1998 | Hoath | 73/49.3 |
| 5,939,619 A | 8/1999 | Achter et al. | |
| 6,050,133 A * | 4/2000 | Achter et al. | 73/40.7 |
| 6,314,794 B1 | 11/2001 | Seigeot | |
| 6,460,405 B1 * | 10/2002 | Mayer et al. | 73/40.7 |
| 6,609,414 B2 * | 8/2003 | Mayer et al. | 73/40.7 |

* cited by examiner

*Primary Examiner*—Hezron E. Williams
*Assistant Examiner*—John Fitzgerald
(74) *Attorney, Agent, or Firm*—Venable LLP; Eric J. Franklin

(57) ABSTRACT

A system and a method for determining the leakproofness of an object having a first cavity. The system includes a closed chamber having a second cavity arranged to envelope the object, an evacuator for lowering the pressure inside one of the cavities, a supply for supplying a tracer gas into the one of the cavities rendered the higher pressure, a detector sensitive to the tracer gas and an introducer for introducing a transport gas into the one of the cavities rendered the lower pressure. Furthermore, the evacuator is arranged to compress arriving gas to the ambient pressure of the chamber and to communicate with the detector, which is suited for operation at the ambient pressure of the chamber. The tracer gas includes hydrogen.

22 Claims, 2 Drawing Sheets

SYSTEM AND METHOD FOR DETERMINING THE LEAKPROOFNESS OF AN OBJECT

CROSS-REFERENCE TO RELATED APPLICATIONS

This application claims priority to Swedish patent application 0303278-6 filed Dec. 5, 2003 and Japanese patent application 2003-407157 filed Dec. 5, 2003 and is the national phase under 35 U.S.C. §371 of PCT/SE2004/001783.

FIELD OF THE INVENTION

The present invention relates to a system for determining the leakproofness of an object Furthermore, the present invention relates to a method for determining the leakproofness of an object.

BACKGROUND OF THE INVENTION

The leakproofness of an object might be necessary or desired to determine for different reasons. For example, the leakproofness might be required to be tested due to environmental concern or quality control. The number of industrial products and utilities required to be tested for leakage has greatly increased during the recent years, which above all depends on increased demands on environmental concern and improved quality. Typical examples of products required to be tested for leakage are parts of refrigeration systems for commercial, domestic and automotive use as well as all types of liquid and gas carrying parts in the automotive industry, such as for example fuel tanks and aluminium wheels.

There are many different methods that can be used for detecting fluid leaks in an object. The two most widely used methods are bubble testing with soap solution and water dunking respectively, wherein the object is submerged in soap solution and water respectively and wherein bubbles then indicate leakage. These two methods are simple, low cost methods, but with restricted sensitivity and high operator dependence. More advanced methods include pressure decay techniques and the below described tracer gas techniques.

All of the above mentioned methods are based on the principle that the object under test or an ambient space of the object is pressurized with a gas, which often is air, and that the gas flows through any leak. When the gas escapes on the low pressure side it is detected in some way. The detection can be done through detecting bubbles visually or by means of some type of instrument detecting pressure, flow or the actual presence of the leaking gas.

In use of methods for leakage testing based on tracer gas techniques, a tracer gas is used for detecting leakage. Such methods generally employ a gas or gas mixture that can be detected after leak passage by means of a detecting instrument. The most commonly used tracer gas today is helium, which typically is detected by a mass spectrometer. Other common tracer gases are refrigerants, sulfur hexafluoride and carbon dioxide.

In some tracer gas methods some type of chamber or enclosure is placed around the complete object or a part of the object under test. The tracer gas is then either added within the object or within the enclosure. Thus, the enclosure is either used to collect any tracer gas leaking from the object or is filled with tracer gas, whereby any leaking tracer gas leaks from the enclosure into the object and any leaking gas is collected inside the tested object. The place where the tracer gas is added, i e within the object or within the enclosure, and thus the direction of any leak flow of tracer gas is decided from case to case and depends on the object to be tested.

One common method today for detecting any tracer gas leaking out into the enclosure or into the object that is relevant to this invention is the so-called accumulation method. For simplicity the principles of this method is only described below for filling the object with tracer gas and detecting any leaking gas in the enclosure, but it is of course also suited for filling the enclosure with tracer gas and detecting any leaking gas within the object.

In the accumulation method any tracer gas that leaks from the object filled with tracer gas is allowed to accumulate in the enclosure during a pre-set time denoted as accumulation time. The concentration of tracer gas in the enclosure increases with time and depends on the leak flow of tracer gas and the volume of the void in the enclosure in which the tracer gas is allowed to accumulate. The volume of the void is denoted as dead volume in the following.

The concentration of tracer gas in the dead volume develops according to the following equation:

$$C_{tracer} = \frac{t_{acc} * C_{mixtracer}}{V_{test}} * F_{leak}$$

where:
$C_{tracer}$=average tracer gas concentration in the dead volume.
$t_{acc}$=accumulation time.
$C_{mixtracer}$=tracer gas concentration in tracer gas mix (if a mix of tracer gas is used)
$V_{test}$=dead volume in which the leaking tracer gas is accumulated
$F_{leak}$=leak flow As can be seen from this equation, the average tracer gas concentration is directly dependent on the dead volume in the accumulation method.

High sensitivity and high test speed are usually the most important factors to achieve by the used method when determining tracer gas leakage. From the equation above it can be realized that the major parameter limiting the sensitivity as well as the test speed using the accumulation method is the dead volume. Accordingly, in order to achieve as high sensitivity and as high test speed as possible, the dead volume should be as small as possible.

For leakage testing using the accumulation method, the dead volume can be reduced strictly geometrically by building an enclosure that fits more tightly around the test object. However, the cost for geometrical volume reduction increases rapidly with smaller volume and particularly if the geometry of the test object is complex.

Another way of reducing the dead volume for leakage testing using the accumulation method is to reduce the total gas pressure in the volume. This is commonly known as vacuum chamber testing and is widely used in combination with mass spectrometers, which are well suited for vacuum chamber testing since they operate at high vacuum and therefore can be directly applied to the vacuum chamber. The dead volume scales proportionally with the absolute pressure in the chamber. The concentration of tracer gas in the dead volume then develops according to the following equation:

$$C_{tracer} = \frac{t_{acc} * C_{mixtracer} * P_{atm}}{V_{test} * P_{test}} * F_{leak}$$

where:

$C_{tracer}$=average tracer gas concentration in the dead volume
$t_{acc}$=accumulation time
$C_{mixtracer}$=tracer gas concentration in tracer gas mix (if a mix of tracer gas is used)
$V_{test}$=dead volume in which the leaking tracer gas is accumulated
$P_{test}$=absolute pressure in the dead volume
$P_{atm}$=atmospheric pressure (or ambient pressure)
$F_{leak}$=leak flow As can be seen from the equation above, the influence of the dead volume has been reduced by the ratio between the pressure in the dead volume and that of the ambient. The dead volume apparent after reduction of the total gas pressure in the volume is in the following denoted as effective dead volume.

Systems reducing the dead volume by lowering the pressure in the chamber generally employ pressures low enough to ensure high speed mobility of the gas molecules in the dead volume of the chamber. Such pressure is herein denoted as high vacuum. By having high vacuum in the chamber the gas molecules will move at high speed from the leak point to the detector. Another benefit of using high vacuum is that the effective dead volume often is so small that accumulation is not needed.

However, high vacuum systems require advanced pumps and valves that are both delicate and costly. Experience shows also that such systems are very difficult and costly to maintain in normal industrial environments. Furthermore, mass spectrometers which often are used for detection in vacuum chamber testing are very expensive and complicated and therefore costly to maintain. Thus, both capital investments and maintenance costs for vacuum chamber testing are high.

By comparison, systems for testing at atmospheric pressure are cheaper to build and maintain. This is due to the fact that costly vacuum pumps and valves are not needed, but also to that cheaper electronic leak detectors can be used instead of the highly complicated mass spectrometers. However, testing at atmospheric pressure implies a low test speed and a relatively low sensitivity if the dead volume is not reduced. Since the costs for geometrical volume reduction of the dead volume in the enclosure, as mentioned above, is high, testing at atmospheric pressure is generally not suitable for determining leakage at the low leak limits defined in the refrigeration industry and neither for large objects, such as fuel tanks and aluminium wheels.

The most commonly used tracer gas, helium, is a relatively expensive gas and is not a renewable natural resource. Furthermore, it is commonly known that if helium is spilled in or around testing equipment, helium tends to dwell on surfaces and generates thereby increased background signals or false leak signals. Thus, spilling of helium can lead to minutes or even hours of waiting for the gas to dissipate before the testing equipment can be used again.

Thus, in leakage testing using the accumulation method at low pressure, i e high vacuum, it is possible to achieve relatively high test speed as well as high sensitivity, but then the equipment and maintenance costs are high. Leakage testing using the accumulation method at atmospheric pressure is compared to leakage testing at low pressure associated with a lower cost but also lower test speed as well as lower sensitivity.

Accordingly, there is therefore a need for an improved system and an improved method for achieving high test speed and high sensitivity as well as low equipment and maintenance costs for leakproofness determination when the object to be tested is enclosed in an enclosure and a tracer gas is used.

SUMMARY OF THE INVENTION

It is an object of the present invention to provide an improved system for determining the leakproofness of an object having a first cavity, said system comprising: a closed chamber having a second cavity, which chamber is arranged to envelope said object within said second cavity; evacuating means being arranged to lower the pressure inside one of said first and second cavities with respect to the ambient pressure; supplying means for supplying a tracer gas into the one of said cavities rendered the higher pressure; and detecting means being sensitive to said tracer gas.

Thanks to that the method further comprises that the step of detecting said tracer gas is preceded by a step of introducing a transport gas other than said tracer gas into the one of the cavities rendered the lower pressure by introduction means for transporting any tracer gas in the one of the cavities rendered the lower pressure towards the detecting means via the evacuating means, a step of compressing gas arriving at the evacuating means to the ambient pressure of the chamber and a step of pumping compressed gas to the detecting means by the evacuating means, that the step of detecting the tracer gas comprises detecting at the ambient pressure of the chamber and that the tracer gas is hydrogen, it is possible to achieve a relatively high test speed and high sensitivity as well as a low equipment and maintenance cost.

It is a further object of the present invention to provide an improved method for determining the leakproofness of an object having a first cavity, said method comprising: enveloping said object within a second cavity of a closed chamber; establishing by evacuating means a lower pressure inside one of said first and second cavities with respect to the ambient pressure; supplying a tracer gas by supplying means into the one of said cavities rendered the higher pressure; and detecting said tracer gas in the one of said cavities rendered the lower pressure with detecting means being sensitive to said tracer gas.

Thanks to that the method further comprises that the step of detecting said tracer gas is preceded by a step of introducing a transport gas other than said tracer gas into the one of the cavities rendered the lower pressure by introduction means for transporting any tracer gas in the second cavity towards the detecting means via the evacuating means, a step of compressing gas arriving at the evacuating means to the ambient pressure of the chamber and a step of pumping compressed gas to the detecting means by the evacuating means, that the step of detecting the tracer gas comprises detecting at the ambient pressure of the chamber and that the tracer gas is hydrogen, it is possible to achieve a relatively high test speed and high sensitivity as well as a low equipment and maintenance cost.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE INVENTION

Figure 1:
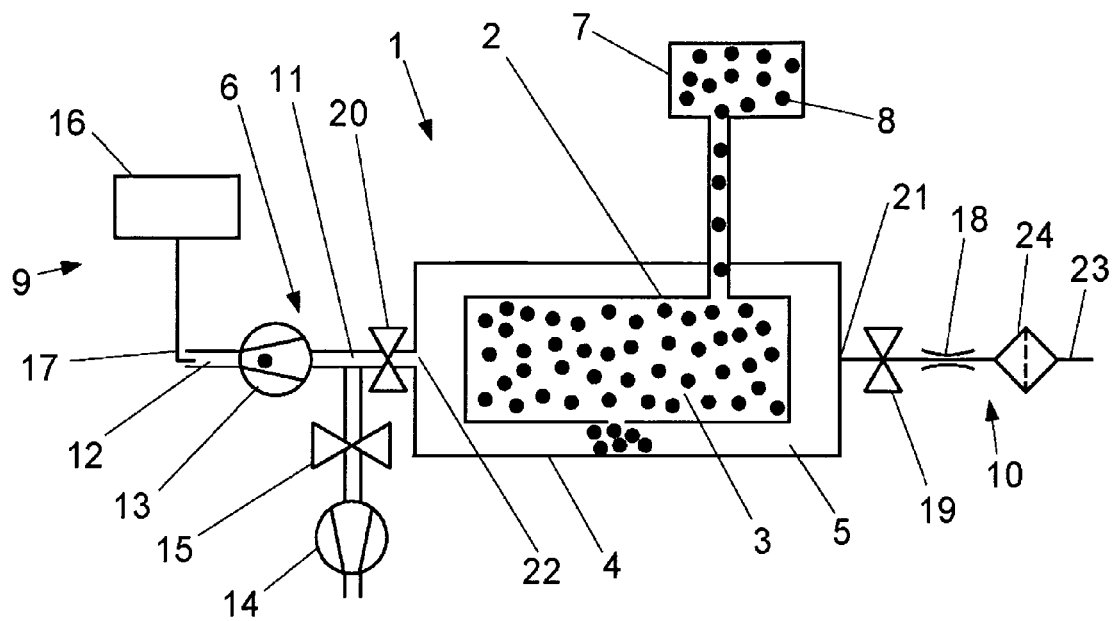
FIG. 1 shows a schematic view of a first embodiment of a system in accordance with the invention, which is suited to be used for applying one so-called accumulation method.

FIG. 1 shows a system 1 in accordance with the present invention, which system 1 is arranged to be used for determining the leakproofness or the impermeability of an object 2 having a first cavity 3. The first embodiment of the system 1 is suited to be used for applying a tracer gas method in which the object to be tested is placed in a chamber or enclosure. More particularly, the system 1 is suited to be used for applying the above described accumulation method. The system 1 comprises a closed chamber or enclosure 4 having a second cavity 5, evacuating means 6, supplying means 7 for supplying a tracer gas 8, detecting means 9 being sensitive to the tracer gas 8 and introduction means 10 for introducing a transport gas.

The chamber 4 is arranged to envelope the object 2 to be tested for leakage within the second cavity 5, which therefore has such a size and shape that it is able to accommodate the object 2 to be tested. When the object 2 is located within the second cavity 5, there is also some void space, i e dead volume, in the second cavity 5, which according to the above is the main parameter limiting the test speed and the sensitivity in the accumulation method. However, as will be described in more detail below, it is not necessary in accordance with the present invention to build a chamber that fits more tightly around the object to be tested or to use very low pressure, i e high vacuum, within parts of the system for reducing the dead volume.

In the first embodiment of the system 1, the evacuating means 6 is arranged to lower the pressure in the second cavity 5 with respect to the ambient pressure of the chamber 4, which however usually is the same as the pressure within the second cavity 5 before the evacuation, in order to reduce the dead volume to at least some extent.

Preferably, the evacuating means 6 is arranged to reduce the pressure in the second cavity 5 to preferably between 0.1 and 250 mbar, which gives an effective dead volume in the second cavity 5 that is between 4 and 1000 times smaller than the actual geometrical dead volume in the second cavity 5. The evacuating means 6 comprises a pump 13, which may be of a conventional type such as for example a membrane pump and an inlet 11 and an outlet 12. Furthermore, the pump 13 is arranged to compress any gas, arriving from the second cavity 5 through the inlet 11, to the ambient pressure of the chamber 4 and then to pump out any compressed gas through the outlet 12. Usually, the ambient pressure of the chamber 4 is the atmospheric pressure.

Optionally, the evacuating means 6 may also comprise an extra pump 14 and a pump valve 15. The extra pump 14 is also connected to the second cavity 5 for reducing the pumping time required to lower the pressure in the second cavity 5 to a desired pressure and is preferably connected to the inlet 11.

The pump valve 15 is arranged to regulate the influence of the extra pump 14. For example, the extra pump 14 may be a low cost pump capable of providing a reduction of the pressure to within the range of 50-950 mbar. An example of such a pump is a so-called Venturi effect pump, but other types of pumps may of course also be suitable.

In order to enable detection of any leaks, the supplying means 7, such as a cylinder of compressed gas with thereto connected flow regulating device, is arranged to supply one detectable tracer gas 8 or a gas mixture containing the tracer gas 8 to the first cavity 3. According to the invention, hydrogen is utilized as tracer gas. The hydrogen used is preferably contained in a tracer gas mixture including 5% hydrogen and 95% nitrogen, which compared to the most commonly used tracer gas helium generally is significantly cheaper. Furthermore, hydrogen has roughly half the viscosity and half the mass compared to that of helium and is therefore suited for this type of leakage testing. Hydrogen is also a renewable natural resource. Furthermore, the above mentioned problems associated with that helium tends to dwell on surfaces upon accidental spillage, have been found to be virtually non-existent when using hydrogen. Thus, using hydrogen as tracer gas instead of helium implies for essentially shorter clean-up times and will therefore increase the average productive time of the system.

Usually the tracer gas 8 is pressurized in order to promote a leak flow of tracer gas 8 from the first cavity 3 into the second cavity if there are any leaks in the object 2.

The detecting means 9 is sensitive to the tracer gas 8 and is arranged to detect any tracer gas 8 in the second cavity 5, i e any tracer gas 8 that has leaked from the tested object 2 and into the second cavity 5. Preferably, the detecting means 9 comprises a detector 16 having a probe 17, which preferably is arranged to be placed in the outlet 12 of the evacuating means 6. The probe 17 is arranged to either pick up or detect gas in the outlet 12 and is for example a sampling hose or a sensor communicating with the detector 16. Thus, in the first embodiment the detecting means 9 is arranged to communicate with the second cavity 5 through the evacuating means 6.

Since the pump 13 is arranged to compress gas arriving from the second cavity 5 to the ambient pressure of the chamber 4 and to pump out gas being compressed to the ambient pressure through the outlet 12, the probe 17 is operated at the ambient pressure. As mentioned above the ambient pressure is usually the atmospheric pressure and detectors operating at atmospheric pressure are essentially simpler and less complicated than detecting means operating at high vacuum such as mass spectrometers. Furthermore, the fact that the detector 16 is allowed to operate at atmospheric pressure despite that the pressure in the second cavity 5 is lower than the atmospheric pressure, makes it possible to use many types of leak detectors in applications in which they have not been possible to utilize before. In addition, the fact that no very low pressure, i e high vacuum, is applied in the system 1 makes it not only possible to use cheaper and less complicated detecting means, but also for example pumps, valves and chamber seals in the system 1 that are cheaper and less complicated compared to those utilized in systems in which high vacuum is applied. The capital investment, operating costs and maintenance costs of one system according to the invention are thus very low compared to systems operated at very low pressures.

Even if the dead volume in the second cavity 5 is reduced by lowering the pressure, it is according to the following invention not reduced to very low pressure, i e high vacuum, and thus the dead volume is not reduced to such an extent that a satisfactory high test speed is achieved. In order to be able to even further increase the test speed, the introduction means 10 is comprised in the system 1. The introduction means 10 is arranged to introduce continuous flow of a transport gas into the second cavity 5 to transport any tracer gas 8 in the second cavity 5 towards the detecting means 9. Thus, the introduction means 10 is arranged to reduce the time it takes for any tracer gas 8 in the second cavity 5 to reach the detecting means 9 and therefore also to increase the test speed.

Since the accumulation method includes an accumulation time, the introduction means 10 in the first embodiment is arranged to introduce the transport gas during a controlled time interval after the accumulation time in order to transport any accumulated gas in the second cavity 5 towards the detecting means 9. The introduction means 10 comprises an inlet 23 for the transport gas and flow regulating means 18 in order to be able to regulate the flow of the transport gas. For example the transport gas is air or nitrogen. Usually air taken directly from the surroundings of the system 1 is used as transport gas. In order to eliminate any tracer gas 8 that has leaked out into the surrounding air during an earlier test or by accident and/or other contaminants from the transport gas intended to be introduced into the second cavity 5, the introduction means 10 may also optionally comprise a filter 24 located in the inlet 23 for eliminating such contaminants. The filter 24 implies that hydrogen, which is the tracer gas used in this invention, in surrounding air used as transport gas is oxidized to water. One example of such a filter 24 is a catalytic filter. When the most commonly used tracer gas helium is used instead of hydrogen, it is not possible to use such a filter for eliminating helium residues in the surrounding air, because helium is an inert gas. Thus, using hydrogen instead of helium implies that contaminating tracer gas easily and quickly can be eliminated from the surrounding air or transport gas using a filter such as the above described. Tracer gas residues in the enclosure is a well known problem in the art.

Furthermore, the transport gas is introduced into a second cavity 5 through an inlet 21 located between the flow regulating means 18 and the chamber 4. The transport gas is a gas other than the tracer gas 8 in order to be able to detect the tracer gas 8 and the detecting means is non-sensitive for the transport gas.

Furthermore, in order to permit accumulation during the accumulation time, the system 1 comprises a first valve 19 in the inlet 21 and a second valve 20 in an outlet 22, which is located between the chamber 4 and the inlet 11 of the evacuating means 6. Alternatively the first valve 19 and the second valve 20 may be comprised in other parts of the system 1, such as for example in the flow regulating means 18 and the evacuating means 6, respectively.

Thus, through the system 1 comprising the introduction means 10, it is possible to achieve a satisfactory high test speed and sensitivity without reducing the dead volume through reducing the pressure in the second cavity 5 to one very low pressure, i e high vacuum, or through geometrical fitting of the chamber 4 to the object 2.

Figure 2:
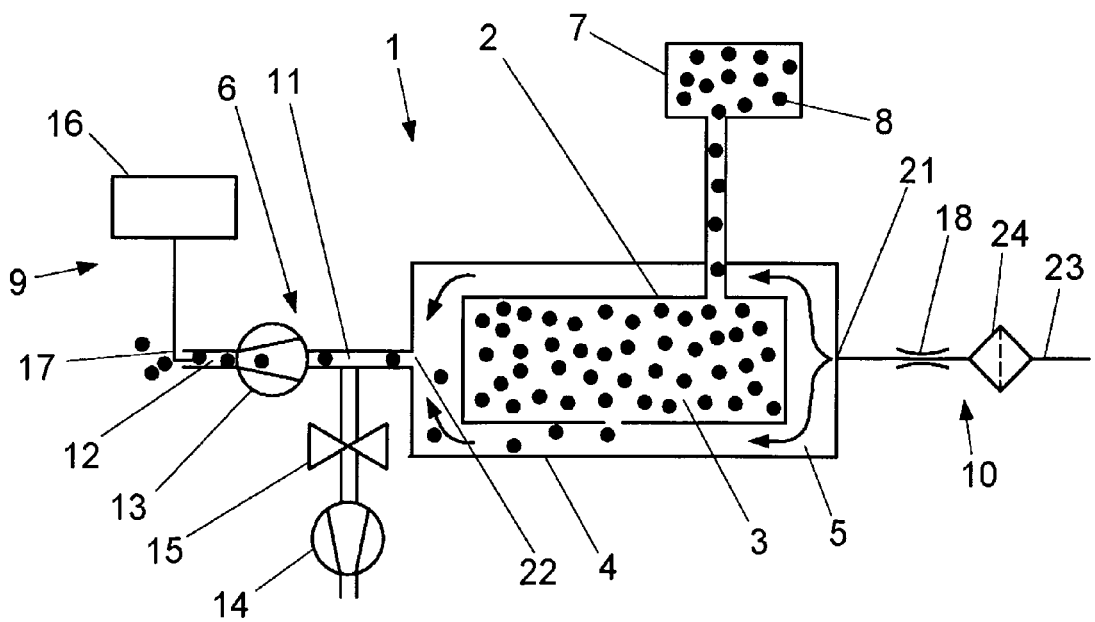
FIG. 2 shows a schematic view of a second embodiment of a system in accordance with the invention, which is suited to be used for applying one so-called steady-state analysis method.

FIG. 2 shows a second embodiment of the system 1, which is suited to be used for applying a tracer gas method in which the object to be tested is placed in a chamber or enclosure. More particularly, the second embodiment is suited to be used for leakage testing applying a so-called steady-state analysis method instead of the accumulation method.

In the steady-state analysis method all leaking gas is collected in a continuous flow of transport gas and the concentration of tracer gas in a sample will then be decided by the ratio between the leak flow and the transport flow according to the following equation:

$$C_{sampletracer} = \frac{F_{leak}}{F_{transport}} * C_{tracer}$$

where
$C_{sampletracer}$=average concentration of tracer gas in a sample
$F_{leak}$=leak flow
$F_{transport}$=transport flow
$C_{tracer}$=tracer gas concentration in tracer gas mix (if a mix of tracer gas is used)

Thus, in the steady-state analysis method the sample concentration is not directly dependent on the dead volume. However, the time needed to establish a steady-state situation, i e a steady-state concentration of tracer gas in the transport flow, is dependent on the dead volume of the enclosure as described by the following equation:

$$t_{SS} = \frac{V_{vest}}{F_{transport}}$$

where:
$t_{SS}$=time needed to create a steady-state concentration in the transport flow
$V_{test}$=dead volume in which any leaking tracer gas is accumulated
$F_{transport}$=transport flow Thus, the dead volume is also in the steady-state analysis method an important parameter limiting the test speed. Lowering the pressure in the second cavity 5 gives a reduced effective dead volume which reduces the time needed to reach steady-state conditions and thereby increases the total test speed. Alternatively the small effective dead volume allows for reducing the transport flow rendering a higher sensitivity.

The second embodiment of the system 1 resembles the first embodiment except for concerning the introduction means 10, the first valve 19 and the second valve 20. The introduction means 10 is in the second embodiment also arranged to introduce a continuous flow of transport gas during a controlled time interval, but not after an accumulation time since the steady-state analysis method does not comprise an accumulation time. The first and second valves 19, 20 are not comprised in the second embodiment.

Figure 3:
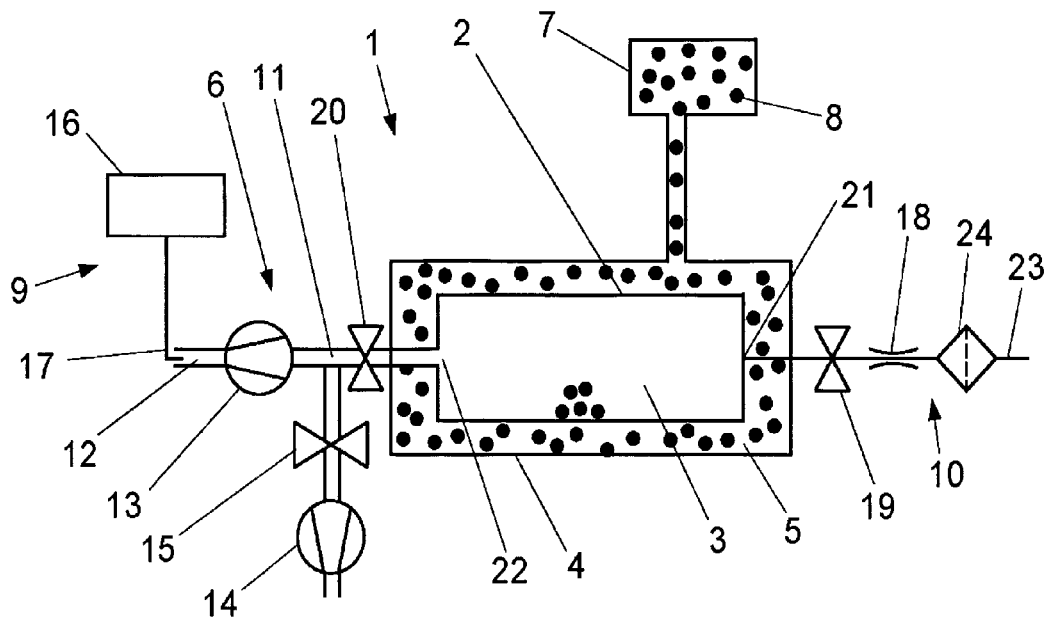
FIG. 3 shows a schematic view of a third embodiment of a system in accordance with the invention, which is suited to be used for applying one so-called accumulation method.

FIG. 3 shows a third embodiment of the system 1, which is arranged to be used for leakage testing applying the above described accumulation method. The third embodiment resembles the first embodiment except for that the third embodiment is arranged for testing leakage from the second cavity 5 and into the first cavity 3 instead of from the first cavity 3 and into the second cavity 5. Thus, in the third embodiment, the evacuating means 6 is arranged to lower the pressure in the first cavity 3 with respect to the ambient pressure, which however usually is the same as the pressure within the first cavity 3 before the evacuation, in order to reduce the dead volume in which any gas leaking from the second cavity 5 accumulates.

In order to be able to test leakage from the second cavity 5 and into the first cavity 3, the supplying means 7 is then arranged to supply the tracer gas 8 to the second cavity 5 and the detecting means 9 is arranged to detect any tracer gas in the first cavity 3. Thus, the detecting means 9 is then arranged to communicate with the first cavity 3 through the evacuating means 6. Furthermore, the introduction means 10 is arranged to introduce the transport gas into the first cavity 3 towards the detecting means 9. The inlet 21 is in the third embodiment located between the flow regulating means 18 and the object 2 and the outlet 22 is located between the object 2 and the inlet 11 of the evacuating means 6.

Figure 4:
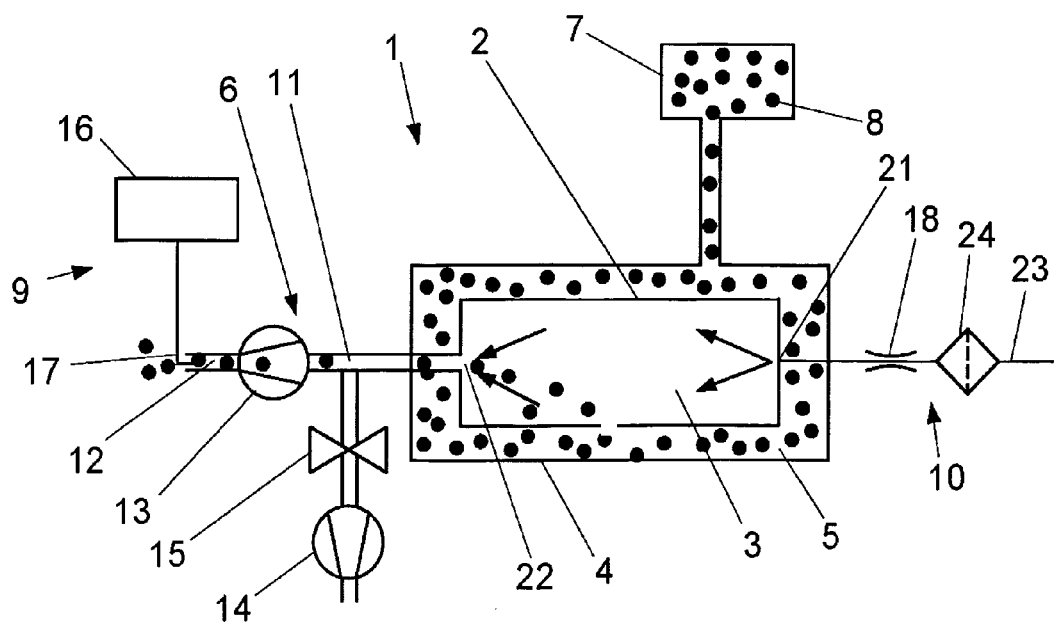
FIG. 4 shows a schematic view of a fourth embodiment of a system in accordance with the invention, which is suited to be used for applying one so-called steady-state analysis method.

FIG. 4 shows a fourth embodiment of the system 1, which is arranged to be used for leakage testing applying the above described steady-state analysis method. The fourth embodiment resembles the third embodiment except for concerning the introduction means 10, the first valve 19 and the second valve 20. The introduction means 10 is in the fourth embodiment also arranged to introduce a continuous flow of transport gas during a controlled time interval, but not after an accumulation time since the steady-state analysis method does not comprise an accumulation time. The first and second valves 19, 20 are not comprised in the fourth embodiment.

A fifth embodiment of the system 1 (not shown) is arranged to be used for leakage testing applying the above described accumulation method. The fifth embodiment resembles the third embodiment except for concerning the introduction means 10. In the fifth embodiment, the introduction means 10 is arranged to introduce a controlled amount of the transport gas into the first cavity 3 for compressing any accumulated tracer gas 8 in the first cavity 3 to a short and concentrated pulse. Furthermore, the introduction means 10 is arranged to introduce the controlled amount during a first part of the controlled time interval of introducing transport gas. The introduction means 10 is also arranged to introduce a continuous flow of the transport gas into the first cavity 3 during a second part of the controlled time interval for transporting the pulse created during the first part to the detecting means 9.

Alternatively, the evacuating means 6 is arranged to during an evacuation time interval evacuate gas from the first cavity 3 for transporting the pulse to the detecting means 9.

The fifth embodiment is preferably suited for leakage testing of tube-like objects, but might also be used for objects having other shapes. Furthermore, even if an embodiment resembling the fifth embodiment except for that the system is arranged to provide for leak flow from the first cavity 3 and into the second cavity 5 instead of from the second cavity 5 and into the first cavity 3 is not described, it is however an alternative embodiment.

In a first embodiment a method in accordance with the present invention is suited to be used when one so-called accumulation method is to be applied for determining the leakproofness of an object 2 having a first cavity 3. According to the method, the object 2 to be tested is placed and enveloped within a second cavity 5 of a closed chamber 4. A lower pressure is then established inside the second cavity 5 by the evacuating means 6 with respect to the ambient pressure of the chamber 4, which however usually is the same as the pressure within the second cavity 5 before evacuation, in order to reduce the effective dead volume in which leaking tracer gas 8 accumulates. Preferably, the pressure in the second cavity 5 is reduced to between 0.1 and 250 mbar after finished evacuation, implying that the effective dead volume is reduced between 4 and 1000 times compared to the actual geometrical dead volume.

In order to be able to detect any leaks, a detectable tracer gas 8 is then supplied by means of supplying means 7 into the first cavity 3. The tracer gas 8 is usually pressurized. If there are any leaks in the object 2, a leak flow of tracer gas 8 will then be provided into the second cavity 5 due to the pressure difference. According to the invention, hydrogen is used as tracer gas. Any leaking tracer gas 8 is allowed to accumulate in the second cavity 5 during an accumulation time through closing a first valve 19 located in an inlet 21 and a second valve 20 located in an outlet 22.

Even if the dead volume in the second cavity 5 is reduced by lowering the pressure, it is according to the following invention not reduced to very low pressure, i e high vacuum, and thus the dead volume is not reduced to such an extent that the important parameter test speed is satisfactory high. In order to even further increase the test speed, a continuous flow of a transport gas is introduced after the accumulation time by the introduction means 10 into the second cavity 5 during a controlled time interval. Any accumulated tracer gas 8 in the second cavity 5 is then transported towards the detecting means 9 being sensitive to the tracer gas 8 via the evacuating means 6 by the transport gas. Before the introduction of the transport gas, contaminants may optionally be eliminated using a filter through oxidation. The introduction of the transport gas reduces the time it takes for any tracer gas 8 in the second cavity 5 to reach the detecting means 9 and implies therefore that the test speed is increased. The flow of the transport gas is regulated by the flow regulating means 18. Any leaking tracer gas 8 arriving at the evacuating means 6 through an inlet 11 of the evacuating means 6 is compressed by a pump 13 to the ambient pressure of the chamber 4, pumped out through an outlet 12 of the evacuating means 6 and detected by the detecting means 9 at the ambient pressure. The ambient pressure is usually the atmospheric pressure.

In a second embodiment the method in accordance with the present invention is suited to be used when one so-called steady-state analysis method is to be applied for determining the leakproofness of an object 2 having a first cavity 3. The second embodiment resembles the first embodiment except for that it does not comprise a step of accumulation of tracer gas 8. Thus, the transport gas is introduced without being preceded by any accumulation of tracer gas.

Furthermore, the extent of the leakproofness of the tested object is then determined when a steady-state concentration of tracer gas 8 is achieved in the flow of transport gas, i e the leakproofness is determined by the detecting means 9 through detecting the concentration of tracer gas 8 in the flow of transport gas when there is a steady-state concentration of tracer gas.

In a third embodiment the method in accordance with the present invention is suited to be used when one so-called accumulation method is to be applied for determining the leakproofness of an object 2 having a first cavity 3. The third embodiment resembles the first embodiment except for that it implies for a leakage flow from the second cavity 5 and into the first cavity 3 instead of from the first cavity 3 and into the second cavity 5. In the third embodiment the pressure is therefore lowered inside the first cavity 3 and the tracer gas 8 is supplied within the second cavity 5. Any leaking tracer gas 8 is detected in the first cavity 3 through the detecting means 9 communicating with the first cavity 3 through the evacuating means 6 and the transport gas is introduced into the first cavity 3 after the step of accumulation.

In a fourth embodiment the method in accordance with the present invention is suited to be used when one so-called steady-state analysis method is to be applied for determining the leakproofness of an object 2 having a first cavity 3. The fourth embodiment resembles the second embodiment except for that it implies for a leakage flow from the second cavity 5 and into the first cavity 3 instead of from the first cavity 3 and into the second cavity 5. In the fourth embodiment the pressure is therefore lowered inside the first cavity 3 and the tracer gas 8 is supplied within the second cavity 5. Any leaking tracer gas 8 is detected in the first cavity 3 through the detecting means 9 communicating with the first cavity 3 through the evacuating means 6 and the transport gas is introduced into the first cavity 3.

In a fifth embodiment the method in accordance with the present invention resembles the third embodiment except for that a controlled amount of transport gas is introduced during a first part of the controlled time interval of introducing the transport gas, whereby a short and concentrated pulse of accumulated tracer gas 8 is created. During a second part of the controlled time interval, a continuous flow of transport gas is introduced, whereby the pulse created during the first part is transported towards the detecting means. Alternatively, the pulse is transported towards the detecting means through evacuation during an evacuation time interval by means of the evacuating means 6. The fifth embodiment is preferably used for leakage testing of tube-like objects.

The first part of the controlled time interval may be immediately followed by the second part of the controlled time interval or there might be an extra part between the first part and the second part during which the chamber 4 is closed.

Furthermore, in an alternative of the fifth embodiment, the method comprises at least two steps of introducing transport gas during one controlled time interval, which steps are performed in sequence. If the pulse is transported towards the detecting means by means of the evacuating means, then the method also comprises an evacuation time interval for each step of introducing transport gas.

The invention is not limited to the above-described embodiments, but may be varied within the scope of the following claims. For example, it might be a part of one object that is the object to be tested and the ambient pressure of the chamber might be another pressure than the atmospheric pressure. Furthermore, the introduction means may be arranged to introduce the transport gas during more than one controlled time interval. The evacuating means may comprise other types of pumps than those specifically mentioned and the detecting means may be configured in other ways than those mentioned. The first and second valves may for example be comprised in the flow regulating means and the evacuating means respectively instead of being separate members of the system.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for determining the leakproofness of an object comprising a first cavity, said system comprising:
   a closed chamber comprising a second cavity, wherein the chamber is arranged to envelop said object within said second cavity,
   an evacuator arranged to lower a pressure inside one of said first cavity and second cavity with respect to an ambient pressure of the chamber,
   a supply of a tracer gas supplying the tracer gas into the one of said first cavity and said second cavity having a higher pressure, wherein the tracer gas comprises hydrogen,
   a detector being sensitive to said tracer gas, and
   a supply of a transport gas other than the tracer gas arranged to introduce the transport gas into the one of said first cavity and said second cavity having the lower pressure, wherein said evacuator is further arranged to compress arriving gas comprising the transport gas or the transport gas and the tracer gas to the ambient pressure of the chamber, and wherein said detector is arranged to communicate with the one of said first cavity and said second cavity having the lower pressure via the evacuator and is arranged for operation at the ambient pressure of said chamber.

2. The system according to claim 1, wherein the transport gas is air or nitrogen.

3. The system according to claim 1, further comprising:
   a first valve located in an inlet of the one of said cavities rendered the lower pressure and a second valve located in an outlet of the one of said cavities rendered the lower pressure.

4. The system according to claim 1, further comprising:
   a filter in an inlet for the transport gas.

5. The system according to claim 1, wherein said first cavity is rendered the lower pressure.

6. The system according to claim 1, wherein said second cavity is rendered the lower pressure.

7. The system according to claim 1, wherein said object is an aluminum wheel or an aluminum-alloy wheel.

8. The system according to claim 1, wherein said supply of transport gas is arranged to introduce the transport gas into the one of said cavities rendered the lower pressure during at least one controlled time interval.

9. The system according to claim 8, wherein said supply of transport gas is arranged to introduce the transport gas in a continuous flow into the one of said cavities rendered the lower pressure during the at least one controlled time interval.

10. The system according to claim 8, wherein said supply of transport gas is arranged to introduce a controlled amount of the transport gas into the one of said cavities rendered the lower pressure during a first part of the at least one controlled time interval.

11. The system according to claim 10, wherein said supply of transport gas is further arranged to introduce a continuous flow of the transport gas into the one of said cavities rendered the lower pressure during a second part of the at least one controlled time interval.

12. The system according to claim 10, wherein said evacuator is further arranged to evacuate tracer gas from the one of said cavities rendered the lower pressure towards said detector during an evacuation time interval.

13. A method for determining the leakproofness of an object having a first cavity, said method comprising:
   enveloping said object within a second cavity of a closed chamber,
   establishing with an evacuator a lower pressure inside one of said first cavity and said second cavity with respect to an ambient pressure of the chamber,
   supplying a tracer gas comprising hydrogen into the one of said first cavity and said second cavity rendered the higher pressure,
   detecting said tracer gas in the one of said first cavity and said second cavity rendered the lower pressure with a detector being sensitive to said tracer gas,
   prior to detecting said tracer gas introducing a transport gas other than said tracer gas into the one of said first cavity and said second cavity rendered the lower pressure towards the detector via the evacuator, compressing gas arriving at the evacuator to the ambient pressure of the chamber, the gas arriving comprising the transport gas or the transport gas and the tracer gas, and pumping compressed gas to the detector with the evacuator, wherein detecting said tracer gas comprises detecting at the ambient pressure of the chamber.

14. The method according to claim 13, wherein introducing a transport gas other than said tracer gas into the one of said cavities rendered the lower pressure is preceded by accumulating tracer gas in the one of said cavities rendered the lower pressure.

15. The method according to claim 13, wherein introducing a transport gas further comprises eliminating contaminants in the transport gas using a filter before the introduction.

16. The method according to claim 13, wherein establishing a lower pressure inside one of said first and second cavities comprises establishing the lower pressure in the first cavity.

17. The method according to claim 13, wherein establishing a lower pressure inside one of said first and second cavities comprises establishing the lower pressure in the second cavity.

18. The method according to claim 13, wherein introducing the transport gas into the one of said cavities rendered the lower pressure is performed during at least one controlled time interval.

19. The method according to claim 18, wherein introducing the transport gas into the one of said cavities rendered the lower pressure during the at least one controlled time interval further comprises introducing the transport gas in a continuous flow for transporting tracer gas in the one of said cavities rendered the lower pressure towards said detector.

20. The method according to claim 18, wherein introducing the transport gas into the one of said cavities rendered the lower pressure during the at least one controlled time interval further comprises introducing a controlled amount of transport gas during a first part of the at least one controlled time interval for compressing accumulated tracer gas in the one of said cavities rendered the lower pressure in order to produce a short and concentrated pulse.

21. The method according to claim 20, wherein introducing the transport gas into the one of said cavities rendered the lower pressure during the at least one controlled time interval further comprises introducing the transport gas in a continuous flow during a second part of the at least one controlled time interval for transporting said pulse towards the detector.

22. The method according to claim 20, further comprising: evacuating transport gas with the evacuator from the one of said cavities rendered the lower pressure during at least one controlled evacuation time interval for transporting said pulse towards the detector.

* * * * *